INVENTORS
HENRY J. THOMAS
GEORGE J. TRUSOCK
BY *Robert H Johnson*
ATTORNEY

United States Patent Office 3,524,522
Patented Aug. 18, 1970

3,524,522
APPARATUS FOR VARYING TRUCK SPEED RELATIVE TO UPRIGHT EXTENSION
Henry J. Thomas and George J. Trusock, Battle Creek, Mich., assignors to Clark Equipment Company, a corporation of Delaware
Filed Mar. 26, 1968, Ser. No. 716,240
Int. Cl. B66b 9/20; F15b 15/18
U.S. Cl. 187—9    10 Claims

ABSTRACT OF THE DISCLOSURE

An industrial lift truck having an extendible upright and an operator's station mounted on the upright for elevation with the load engaging fork. The speed control for the truck is responsive to the fluid level in the fluid reservoir associated with the upright so that the truck speed is decreased as the upright is extended.

BACKGROUND OF THE INVENTION

The field of art to which the invention pertains includes elevators, and more specifically portable elevators.

In certain types of warehousing operations it is becoming increasingly common to use a lift truck of the type which has an operator's station that is mounted on the upright for elevation with the load engaging fork. As the upright is raised, the stability of the truck decreases and the danger to the operator increases due, among other things, to the increased height at which the operator is located. Thus, it has been common practice to reduce the speed at which the truck may travel for various elevations of the operator's station and load fork. Generally, this has been done by sensing one or two specific heights of the operator's station and load fork and limiting the truck speed at these heights.

A principal object of our invention is to provide simple apparatus for continuously varying truck speed as the upright is elevated.

SUMMARY OF THE INVENTION

In carrying out our invention in a preferred embodiment, we provide a motor control for steplessly varying the motor speed of the truck and means for continuously sensing the extension of the upright and, in response to the upright extension, actuating the motor control means.

The above and other objects, features and advantages of our invention will be more readily understood by persons skilled in the art when the following detailed description is taken in conjunction with the drawing.

DESCRIPTION OF THE PREFERRED EMBODIMENT

Figure 1:
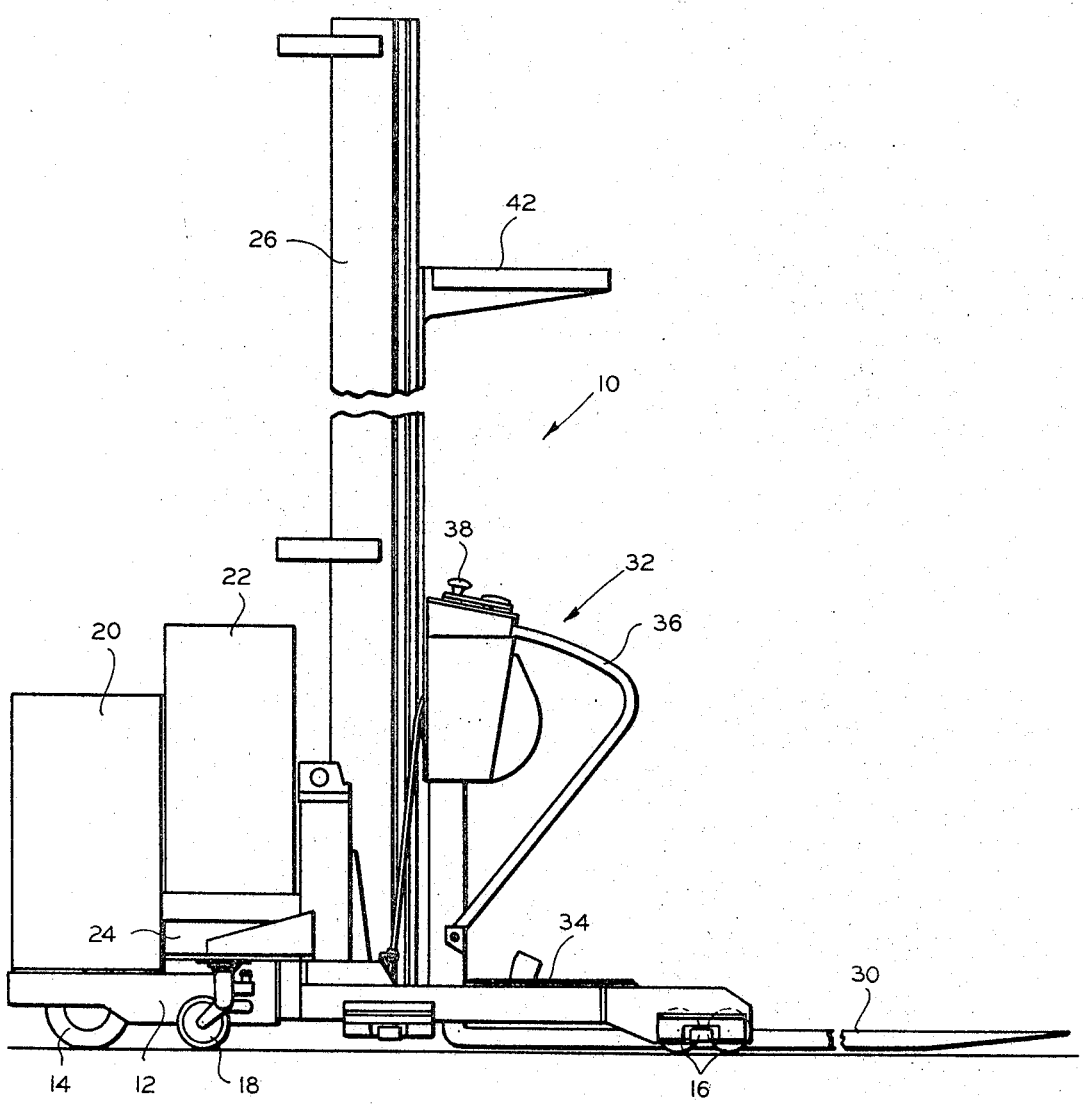
FIG. 1 is a side elevation of an industrial lift truck having an operator's station mounted on the upright for elevation with the load engaging fork and embodying our invention.

Referring now to FIG. 1, the reference numeral 10 denotes generally an industrial lift truck of the so-called "order picker" type. Truck 10 includes a body 12 supported by a drive-steer wheel 14 and a pair of tandem outrigger wheels 16 (only one pair of which is shown). Also, a pair of stabilizer wheels 18 (only one of which is shown) is attached to body 12. Wheel 14 is driven by an electric motor 19 (see FIG. 2) housed in compartment 20, motor 19 being supplied with power from a battery 22 which is mounted on body 12 and located above a fluid reservoir 24.

Figure 2:
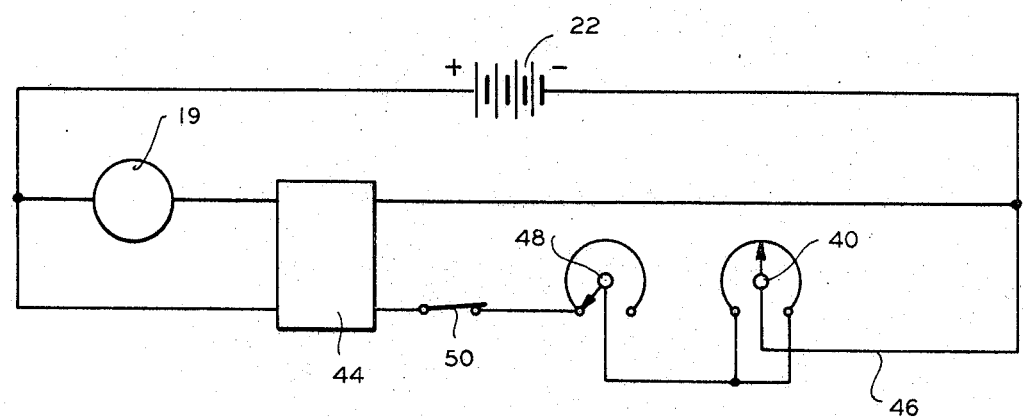
FIG. 2 is a schematic diagram showing the motor speed control.
Figure 3:
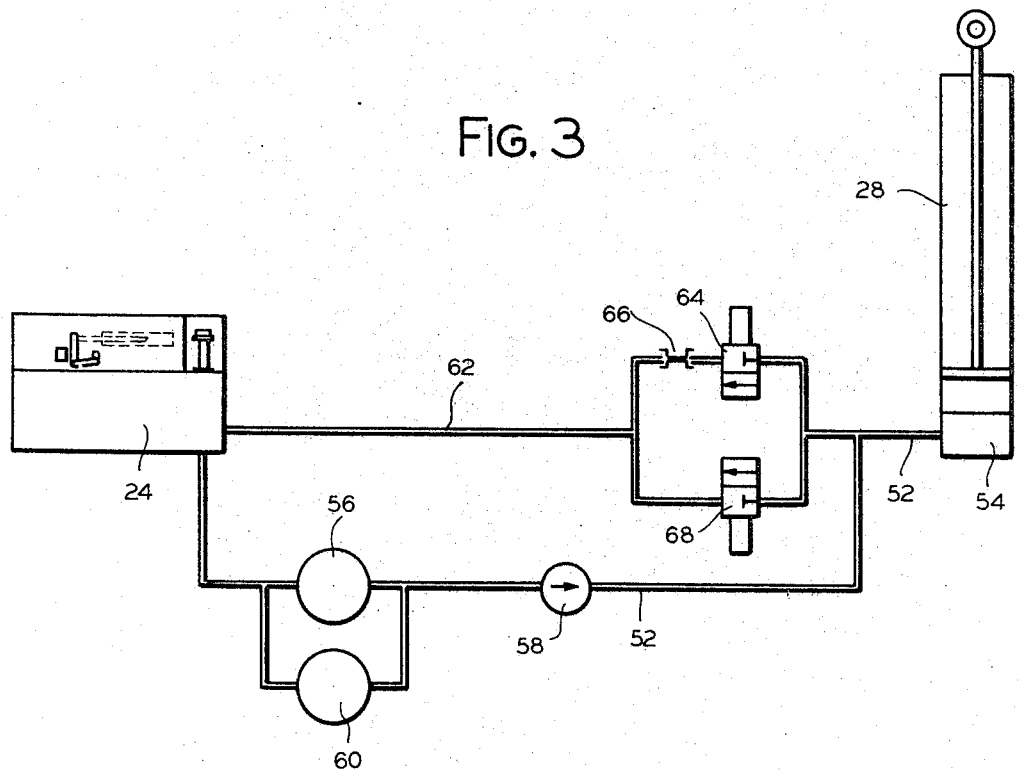
FIG. 3 is a schematic of the hydraulic circuitry associated with the fluid motor for raising the upright.

Also mounted on body 12 is a telescopic upright 26 which can be actuated to extend in a conventional manner by an extendible piston and cylinder type single acting fluid motor 28 which is shown schematically in FIG. 3. Connected to upright 26 for elevation is a pair of load engaging fork arms 30 (only one of which is shown) and operator's station 32 which includes a platform 34 upon which the operator stands, a pair of side guard rails 36, a steering control wheel 38, a manually operated control 40 (FIG. 2) for varying vehicle speed and an overhead guard 42.

An operator can stand on platform 34 at operator's station 32 and control the speed and direction of drive of truck 10 and steer it as well. Also, the operator can control actuation of fluid motor 28 to extend upright 26, thereby raising fork arms 30 and operator's station 32 together.

Referring now also to FIG. 2, it will be seen that the electrical circuitry of truck 10 includes a motor speed control 44 for varying the speed of motor 19 which is powered by battery 22. Control 44 preferably is of the solid state type which functions to control speed of motor 19 by varying the duration of power pulses or the frequency of power pulses from battery 22 to motor 19 in response to a variation in resistance in circuit 46 which includes control 40 and another control 48. Both controls 40 and 48 are variable resistors and are connected in series with each other and with a normally closed switch 50 which is actuated to an open position when upright 26 is extended to a predetermined height which will be explained in more detail later. Control 40 is shown in the maximum resistance position so that there will be minimum motor speed while control 48 is shown in the minimum resistance position so that it has no effect on motor speed at this point. By actuating control 40 to reduce the resistance therethrough the motor speed control 44 is actuated to increase the speed of motor 19. When control 40 is actuated to minimum resistance point the motor speed 19 will be at a maximum. By actuating control 48 to increase the resistance thereof the motor speed will be reduced. When resistance of control 48 is at a maximum the motor speed will be substantially zero. Obviously, by opening switch 50 the result will be the same as providing an infinite resistance in circuit 48 so that when switch 50 is open the motor speed control 44 does not provide any power to motor 19. Thus, the maximum speed at which motor 19 can be driven is no greater than the minimum speed setting of either control 40 or 48.

Referring now to FIG. 3, hydraulic circuitry for extension of upright 26 will be described. As mentioned previously, upright 26 is extended through the action of the single acting piston and cylinder type fluid motor 28. The hydraulic circuitry includes a conduit 52 which is connected between reservoir 24 and a conventional flow control valve 54 which communicates with fluid motor 28. Valve 54 provides substantially unrestricted fluid flow into motor 28 and regulates fluid flow out of motor 28 depending upon the load carried by upright 26. That is, the greater the load the slower the fluid flow from motor 28 through valve 54. Disposed in conduit 52 is a pump 56 which serves to draw fluid from reservoir 24 and supply pressurized fluid to motor 28, thereby causing motor 28 to extend. Also disposed in conduit 52 is a one-way check valve 58 which prevents fluid flow through conduit 52 from motor 28 to reservoir 24. Connected in parallel with pump 56 is another pump 60 so that fluid motor 28 can be extended at one rate of speed when pump 56 is operating and at a higher rate of speed when both pumps 56 and 60 are operating.

Connected between conduit 52 and reservoir 24, as shown, is a return conduit 62. Disposed in conduit 62 is a solenoid operated normally closed valve 64 and a flow restrictor 66. Connected in parallel with valve 64 and restrictor 66 is a normally closed solenoid operated valve 68. Valves 64 and 68 serve to permit lowering of upright 26 at two different speeds. That is, when pumps 56 and 60 are not operating and motor 28 is extended, upright 26 can be lowered due to the weight thereof by energizing solenoid actuated valves 64 to open so that fluid can flow out of motor 28 via conduit 62 back to reservoir 24. Valve 54 serves to regulate flow of fluid out of motor 28 and the flow is further restricted by restrictor 66. In order to provide a higher rate of lowering the operator can actuate valve 68 to open so that restrictor 66 is bypassed with the result that fluid flow out of motor 28 is increased. At this point it will be evident that the level of fluid in reservoir 24 varies in relation to the extension of motor 28. That is, the greater the extension of motor 28 the lower the level of fluid in reservoir 24. Because the extension of motor 28 remains, for all practical purposes, constant for a given extension of upright 26, it is possible to correlate upright extension to the level of fluid in reservoir 24. The importance of this will be further brought out shortly.

Figure 4:
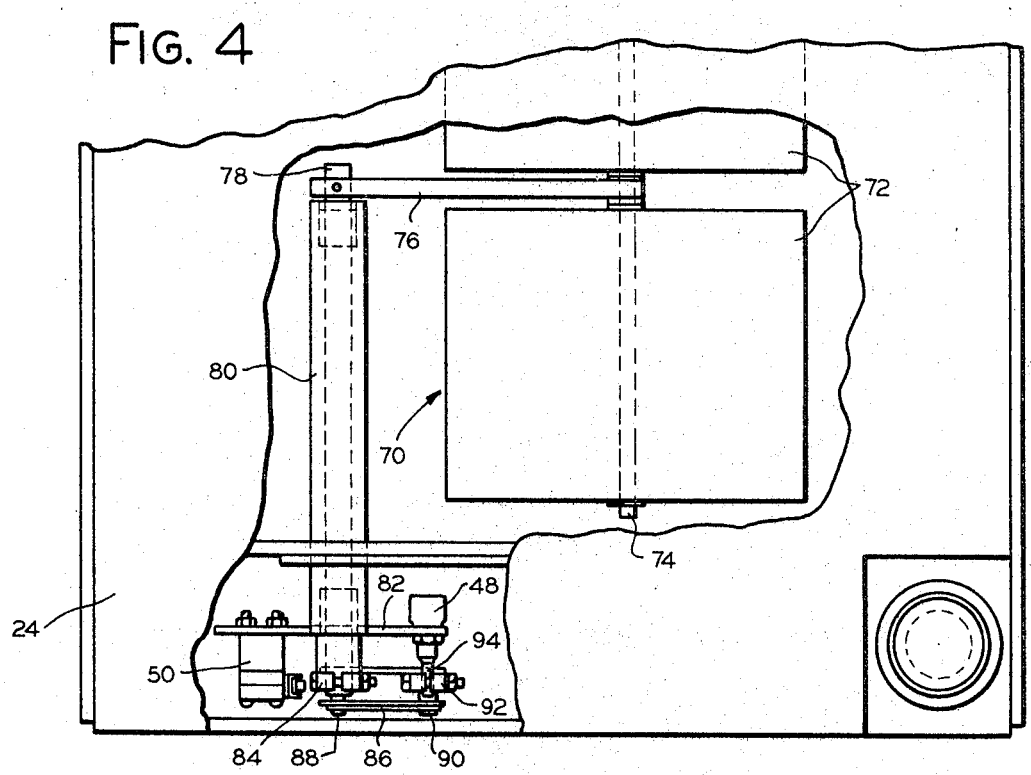
FIG. 4 is a fragmentary plan view on an enlarged scale showing to advantage the float for sensing the fluid level in the reservoir.
Figure 5:
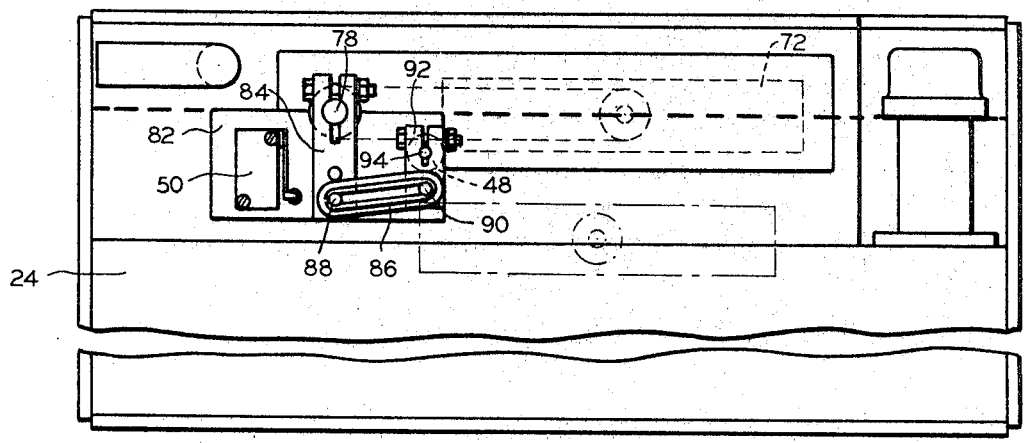
FIG. 5 is a side elevation of the mechanism shown in FIG. 4.

It is desirable to reduce the speed at which truck 10 can travel as upright 26 is extended because the stability of truck 10 inherently decreases as upright 26 extends since the center of gravity of the truck necesarily is being raised. Further, this is especially important in a truck of the so-called "order picker" type because the operator is riding on a platform which is elevated along with the load engaging fork arms with the result that at times the operator may be located as much as 23 feet above the floor. Consequently, we have provided apparatus for continuously decreasing the vehicle speed as upright 26 is extended. Referring now also to FIGS. 4 and 5, we will describe this apparatus. Located in reservoir 24 is a float 70 made up of a pair of generally rectangular blocks 72 of foamed polyurethane or the like. Blocks 72 are pivotally mounted on a shaft 74 which is connected to an arm 76 which is fixed to a shaft 78 that is journalled for rotation in a sleeve 80 which is connected to reservoir 24. Connected to the outer end of sleeve 80 is a mounting plate 82 on which variable resistor 48 and switch 50 are mounted. The outer end of shaft 78 has an arm 84 connected thereto. A link 86 is pivotally connected at one end thereof to arm 84 at 86 and is pivotally connected at the other end thereof at 90 to an arm 92 which is fixed to a shaft 94 of variable resistor 48, rotation of shaft 94 changing the resistance of resistor 48. It will be evident at this point that as the oil level in reservoir 24 is lowered the float 70 will lower also and, through the linkage between float 70 and shaft 94 of resistor 48, cause rotation of shaft 94 so that the resistance of resistor 48 is increased. When the oil level in reservoir 24 has dropped sufficiently far enough arm 84 will have pivoted clockwise to the point where it engages switch 50 and actuates switch 50 to open.

In order to enable persons skilled in the art to better understand our invention we will now explain the operation of it. It will be assumed that an operator is at station 32 and desires to drive the truck in one direction or the other and that upright 26 is in the fully lowered position, as shown in FIG. 1. In order to drive truck 10 the operator manipulates variable resistor 40 to decrease the resistance thereof with the result that the signal to speed control 44 actuates control 44 so that the speed of motor 19 is increased to the desired level. Now, during driving of truck 10, the operator can, if he desires, extend upright 26. This is accomplished by energizing pump 56 or both pumps 56 and 60 to supply pressurized fluid to fluid motor 28, causing it to extend. As fluid motor 28 extends, fluid from reservoir 24 is being pumped into fluid motor 28 so that the fluid level in reservoir 24 is dropping. As the level in reservoir 24 drops the elevation of float 70 also drops with the result that the resistance of variable resistor 48 is increased. The increasing resistance of resistor 48 actuates motor speed control 44 to decrease the speed of motor 19. When upright 26 has been extended a predetermined distance variable resistor 48 will have been actuated by means of the dropping elevation of float 70 to its full resistance. Further elevation of upright 26 causes float 70 to drop somewhat further so that arm 84 engages switch 50 and actuates it to open, thereby completely cutting off all power to motor 19.

While we have described only one embodiment of our invention in detail, this description is intended to be illustrative only, and our invention is subject to various modifications and changes without departing from the scope or spirit thereof. Therefore, the limits of our invention should be determined from the following claims.

We claim:

1. For use with a lift truck having a drive motor and an extendible upright, apparatus for varying motor speed in relation to upright extension comprising motor speed control means for steplessly varying the motor speed in a given speed range and means continuously responsive to upright extension through a given extension range and connected to the said speed varying means for actuating the said speed varying means as the upright extension changes.

2. Apparatus as set forth in claim 1 wherein the said speed varying means includes a manual control for varying motor speed and a separate control connected to the said actuating means for varying motor speed.

3. Apparatus as set forth in claim 2 wherein the said controls are variable resistors which are connected in series so that the maximum motor speed cannot exceed the minimum speed for which either control is set.

4. Apparatus as set forth in claim 1 wherein the said speed varying means includes a positive motor power cut-off means responsive to upright extension for positively cutting off power to the motor when the upright is extended a predetermined distance.

5. Apparatus as set forth in claim 3 wherein the said speed varying means includes a positive motor power cut-off switch connected in series with the said resistors and responsive to upright extension for positively cutting off power to the motor when the upright is extended a predetermined distance.

6. For use wtih a lift truck having a drive motor, an extendible upright, an extendible fluid motor for extending the upright, a fluid reservoir and a pump which draws fluid from the reservoir and supplies it to the motor to cause the motor and upright to extend, apparatus for varying motor speed inversely in relation to upright extension comprising motor speed control means for varying the said motor speed and means responsive to the fluid level in the reservoir for actuating the said speed varying means.

7. Apparatus as set forth in claim 6 wherein the said actuating means includes a float disposed in the reservoir and linkage connecting the said float to the said speed varying means.

8. Apparatus as set forth in claim 7 wherein the said speed varying means includes a variable resistor connected to the linkage so that movement of the said float changes the resistance of the said variable resistor.

9. Apparatus as set forth in claim 7 wherein the said speed varying means includes an operator controlled variable resistor and another variable resistor connected in series with the said first-mentioned resistor and connected to the said linkage for actuation.

10. Apparatus as set forth in claim 9 and including a switch connected in series with the said resistors and responsive to upright extension for completely cutting off power to the drive motor when the upright is extended to a certain point.

References Cited

UNITED STATES PATENTS

| | | | |
|---|---|---|---|
| 1,267,742 | 5/1918 | Bulley | 180—14 D |
| 1,707,657 | 4/1929 | Douglas | 137—399 XR |
| 2,691,385 | 10/1954 | Budd | 137—399 |
| 2,790,513 | 4/1957 | Deaxler | 187—9 |
| 2,935,161 | 5/1960 | Comfort | 187—9 |

EDGAR W. GEOGHEGAN, Primary Examiner

U.S. Cl. X.R.

60—6, 52; 137—399